United States Patent [19]
Salmela

[11] 3,909,047
[45] Sept. 30, 1975

[54] ROTARY ROLLING CONDUIT

[76] Inventor: Gordon O. Salmela, 29 Colby Rd., Braintree, Mass. 02185

[22] Filed: Mar. 11, 1974

[21] Appl. No.: 449,694

[52] U.S. Cl. .................. 285/119; 174/86; 174/135; 285/282
[51] Int. Cl.² ......................................... F16L 55/00
[58] Field of Search ........... 285/136, 272, 281, 184, 285/282, DIG. 8, 119, 114; 403/41; 174/86, 135; 333/95 A; 191/12.2 R; 350/96 B, 96 C

[56] References Cited
UNITED STATES PATENTS

| | | | |
|---|---|---|---|
| 2,037,324 | 4/1936 | Heusinkveld et al. | 191/12.2 |
| 3,026,129 | 3/1962 | Courtot | 285/272 X |
| 3,089,210 | 5/1963 | Ritter | 174/135 X |
| 3,322,886 | 5/1967 | Wurshawsky | 174/86 |

*Primary Examiner*—Dave W. Arola
*Attorney, Agent, or Firm*—Charles Hieken; Jerry Cohen

[57] ABSTRACT

A tubular conduit section is bent into a C-shape and disposed within confronting annular channels so that the conduit section is curved over at least 45° of arc. One of the channels is rotatable relative to the other and, in rotating, moves one end of the conduit section relative to the other end to convert the C-shape to an annular L-shape without kinking or twisting the conduit to provide a flexible, protective interconnection between ends of the section.

8 Claims, 5 Drawing Figures

ROTARY ROLLING CONDUIT

BACKGROUND OF THE INVENTION

The present invention relates in general to coupling between relatively movable members and more particularly concerns novel apparatus and techniques for intercoupling conduits carrying wires or other items between relatively rotatable members with a compact reliably operating package that is relatively inexpensive and easy to fabricate.

It is an important object of the invention to provide a flexible coupling between relatively movable mounting points of the coupling.

It is a further object of the invention to avoid damaging, twisting and kinking of the coupling consistent with the preceding object.

It is a further object of the invention to provide an easily and economically manufacturable simple mechanical configuration consistent with one or both of the preceding objects.

It is a further object of the invention to provide a coupling usable in a variety of applications consistent with one or more of the preceding objects.

It is a further object of the invention to utilize a small geometric envelope consistent with one or more of the preceding objects.

It is a further object of the invention to carry pneumatic or hydraulic lines spanning relatively movable mounting points without damaging, twisting or kinking of the lines consistent with one or more of the preceding objects.

It is a further object of the invention to carry fiber optic bundles, consistent with one or more of the preceding objects.

It is a further object of the invention to carry electric wires consistent with one or more of the preceding objects.

It is a further object of the invention to carry radio frequency cables consistent with one or more of the preceding objects.

It is a further object of the invention to carry a flexible waveguide consistent with one or more of the preceding objects.

It is a further object of the invention to carry mechanical flexible shafting consistent with one or more of the preceding objects.

SUMMARY OF THE INVENTION

A tubular conduit section is bent into a C-curve form and disposed within confronting axially spaced annular channels which further bend the C-shape into an arcuate C-shape. The projection in the azimuth plane of the conduit section spans at least 45°, preferably 180° of arc. The channels have bases and elongated side walls of lengths which are preferably at least equal to channel radius. Preferably, the diameters of the two confronting channels are the same.

The conduit section ends are fixed at mounting points which are relatively movable in a circumferential direction. The azimuth projection length of the conduit section remains constant throughout such relative movement. Conduit section ends are preferably fixed to bases or walls of the confronting annular channels by locking, bonding or frictional engagement. Preferably one of the channels rotates and the other is fixed. The projection in the azimuth plane of the conduit section preferably spans 180° of arc and is arranged so that in at least one position of relative rotation of the section ends, the conduit has a C-shape between its ends, in a second position of relative rotation, the conduit has an L-shape with a leg lying along the base of one of the channels and in a third position of relative rotation, the conduit has an L-shape with a leg of the L lying along the base of the other of the channels.

The conduit itself may constitute an air or hydraulic line or carry a pneumatic or hydraulic tube. Similarly the conduit may constitute a flexible waveguide or mechanical flexible shaft or carry such waveguide or shafting therein. Alternatively, electric wires or fiber optic bundles may pass through the conduit. One of the channels may be secured to fixed structure and the other of the channels may be secured to movable structure, preferably movable structure which is adjacent to, and rotates relative to, the fixed structure.

These and other objects, features and advantages of the invention will become apparent from the following specification read in connection with the accompanying drawing in which:

DETAILED DESCRIPTION OF PREFERRED EMBODIMENTS

Figure 1:
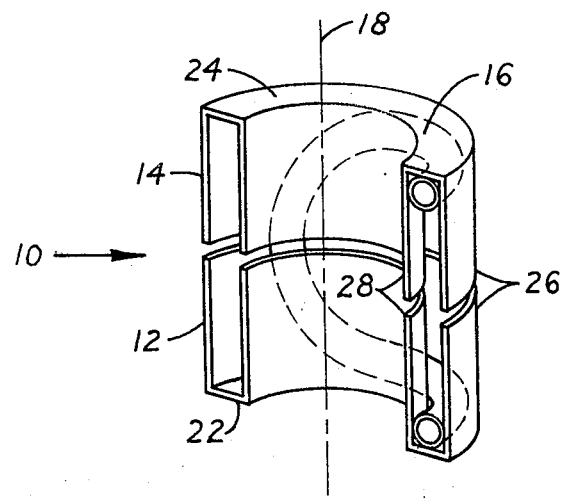
FIGS. 1–3 are isometric views of an embodiment of the invention having partial annular channels in three positions of relative rotation of its confronting channel section.
Figure 2:
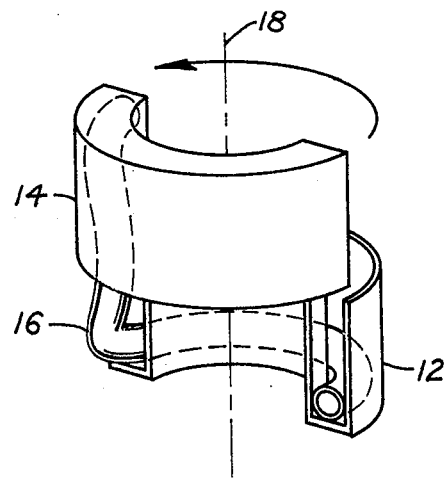
Figure 3:
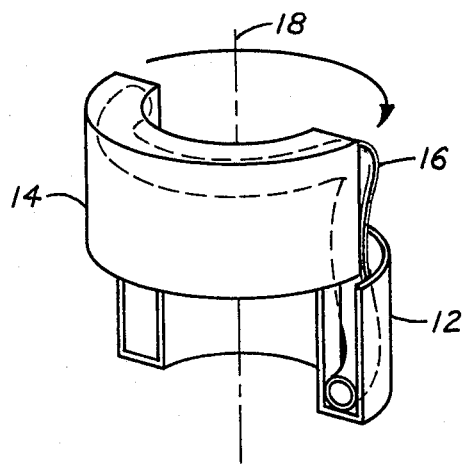

Referring now to the drawing and more particularly FIGS. 1–3, there is shown coupling 10 employing a rotary rolling conduit according to a preferred embodiment of the invention. The coupling comprises confronting axially spaced channels 12 and 14 with a tubular conduit section 16 therein. The channels 12 and 14 are elongated and centered around a common center line 18. A lower end of conduit section 16 is fixed to the base 22 of channel 12 essentially at a single point. An upper end of conduit section 16 is fixed to the base 24 of channel 14 essentially at a single point. Outer and inner sidewalls, 26 and 28, respectively, of the two channels confine intermediate portions of conduit section 16 within the semiannular locus defined by the channels.

Channel 12 is fixed. Channel 14 may rotate around center line 18. If channel 14 rotates counterclockwise from the position shown in FIG. 1, the two channels and conduit section 16 assume the relative positions shown in FIG. 2, changing conduit section 16 from the reverse C-form of FIG. 1 to the L-form of FIG. 2 with a leg of the L lying along base 22 of channel 12. If channel 14 now rotates clockwise 360°, it reaches the position shown in FIG. 3, reorienting conduit section 16 to an L-shape with a leg of the L lying along the base 24 of channel 14. Throughout the whole range of such movements there is no damaging twisting of conduit section 16 about its own center line and no tendency to establish kinks in the conduit.

Figure 4:
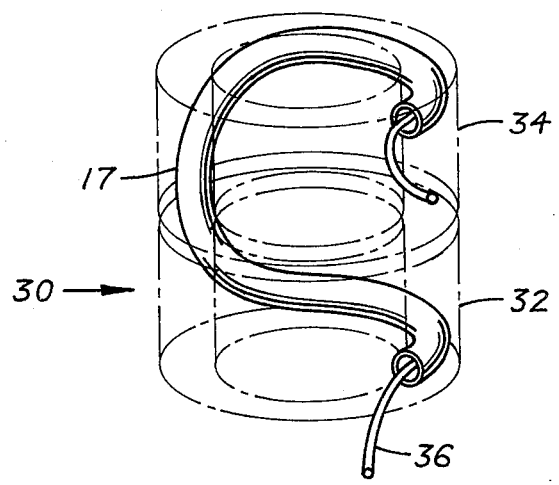
FIG. 4 is an isometric view, shown partially in phantom lines of another embodiment of the invention having full annular channels as well as a longer flexible tube.

Referring now to FIG. 4 there is shown a second preferred embodiment of the invention 30 comprising lower and upper channels 32 and 34 and the conduit section 17. Conduit section 17 is similar to conduit section 16 of the embodiment of FIGS. 1–3, except that conduit section 17 is longer. Channels 32 and 34 are similar to semiannular channels 12 and 14 of the embodiment of FIGS. 1–3, except that channels 32 and 34 are completely annular. Electrical wiring 36 passes through the tubular conduit section 17. Conduit section 17 is fixed at its ends to bases of channels 32 and 34 and is movable through a larger range of positions by relative rotation of channels 32 and 34 than described above in connection with the embodiment of FIGS. 1–3.

Figure 5:
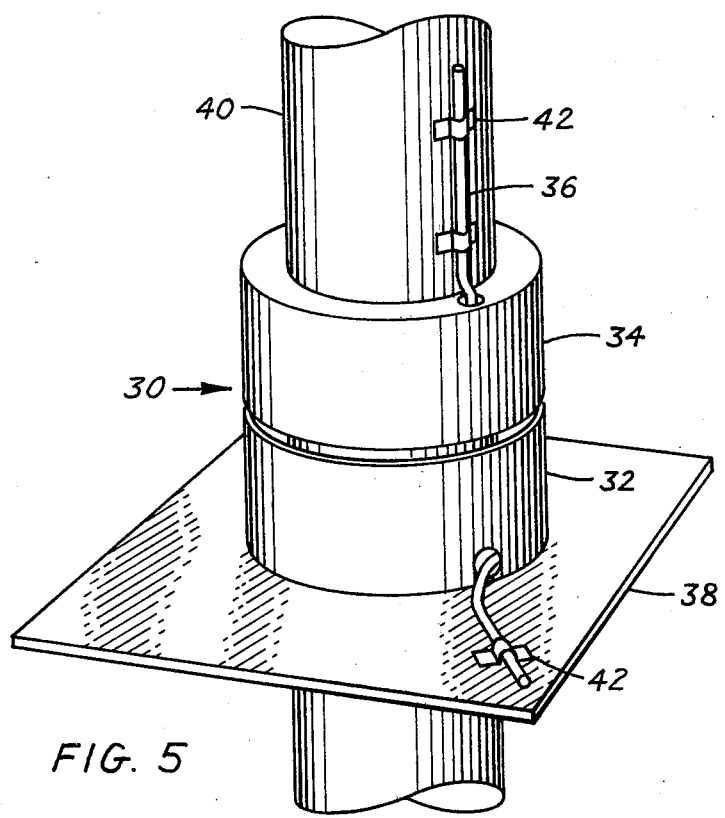
FIG. 5 is an isometric view of the invention in association with a rotating mast typically carrying a radar or other scanning antenna.

Referring to FIG. 5, there is shown an embodiment of the invention comprising the coupling 30 of FIG. 4 with ends of wire 36 mounted therefrom, a fixed deck structure 38 and a rotating mast 40 which may typically carry a radar antenna or other scanning transducer. Mounting clips 42 secure ends of the wire 36 emerging from channels 32 and 34 of coupling 30. Channel 32 and 34 are secured to the fixed deck structure 38 and to the rotating mast 40, respectively. The mast 40 may carry a radar tracking antenna which rotates plus or minus 180°.

In the foregoing embodiments the projection of conduit 16 in the azimuth plane; i.e., the plane orthogonal to center line 18, is fixed at all times. In other embodiments this fixed arc of azimuth projection may be increased or decreased. While the preferred depth of each channel is approximately equal to channel radius the depth of one or both of the channels may be made greater to accommodate turns of more than plus or minus 180°. For instance, turns of plus or minus 360° in the azimuth phase give a total of 720° of travel.

As used herein, the term "annular" includes portions of annuli such as semiannular forms.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Flexible coupling apparatus comprising,
   relatively rotatable first and second members
   means defining a flexible conduit section for intercoupling said relatively rotatable first and second members,
   means securing spaced portions of said conduit section to respective ones of said first and second members,
   said first and second members having means defining confronting axially spaced annular channels for accommodating said flexible conduit section,
   means including the means securing spaced portions of said conduit section and the means defining confronting axially spaced annular channels for mounting said flexible conduit section in said confronting axially spaced annular channels so that in one position of relative rotation of said channels said conduit section forms a generally C-shape and in another position of relative rotation of said channels said conduit section forms a generally L-shape,
   the azimuth projections of said conduit section being of substantially constant arc length in all positions of relative angular displacement between said members.

2. Flexible coupling apparatus in accordance with claim 1 wherein said constant arc length is substantially 180°.

3. Flexible coupling apparatus in accordance with claim 1 wherein one of said members is fixed and the other is rotatable through plus or minus 180°.

4. Flexible coupling apparatus in accordance with claim 1 wherein said members are relatively rotatable through more than one complete rotation.

5. Flexible coupling apparatus in accordance with claim 1 wherein said channels comprise bases,
   said conduit ends being secured to said bases.

6. Flexible coupling apparatus in accordance with claim 1 wherein said channels comprise inner and outer sidewalls confining the conduit to the annular locus defined by said channels throughout substantially the entire conduit length.

7. Flexible coupling apparatus in accordance with claim 1 and further comprising,
   fixed structure mounting means supporting one of said members,
   and rotationally movable structure supporting the other of said members.

8. Flexible coupling apparatus in accordance with claim 1 and further comprising,
   means defining interconnecting structure passing through said conduit for transmitting energy.

* * * * *